United States Patent [19]

Andersson et al.

[11] Patent Number: 4,684,330

[45] Date of Patent: Aug. 4, 1987

[54] DRIVE FOR ROTARY COMPRESSOR

[75] Inventors: Lars Andersson; Rune Glanvall, both of Norrkoping; Kjell Ericson, Kolmarden; Anders Lundberg, Norrkoping, all of Sweden

[73] Assignee: Stal Refrigeration AB, Norrkoping, Sweden

[21] Appl. No.: 295,581

[22] Filed: Aug. 24, 1981

[30] Foreign Application Priority Data

Aug. 28, 1980 [SE] Sweden .............................. 8006019

[51] Int. Cl.$^4$ ............................................. F04B 17/00
[52] U.S. Cl. .................................... 417/360; 418/201; 74/413
[58] Field of Search ................ 418/201, 104; 417/360; 74/412, 413

[56] References Cited

U.S. PATENT DOCUMENTS

| 2,236,854 | 4/1941 | Ocenasek | 74/412 X |
| 3,535,057 | 10/1970 | Kodra | 418/201 X |
| 3,619,086 | 11/1971 | Johnson | 417/360 |
| 3,902,827 | 9/1975 | Schibbye | 418/201 X |

FOREIGN PATENT DOCUMENTS 1557164 12/1979 United Kingdom ................ 418/201

Primary Examiner—Carlton R. Croyle
Assistant Examiner—T. Olds
Attorney, Agent, or Firm—Cyrus S. Hapgood

[57] ABSTRACT

A compressor of the rotary type is driven by a motor via a gear wheel arranged on the shaft of the compressor and cooperating with a gear wheel arranged on the shaft of the motor, the gear wheels and the shafts being enclosed in a gear housing. The motor is fastened to a detachable wall part of the gear housing, and the motor shaft is journalled solely in the bearings of the motor and protrudes into the gear housing through an opening in the wall part. The opening is provided with sealing means which prevent a medium from forcing its way out of the gear housing. The gear wheels are accessible for dismantling and assembly when the wall part together with the motor is detached from the rest of the gear housing.

2 Claims, 1 Drawing Figure

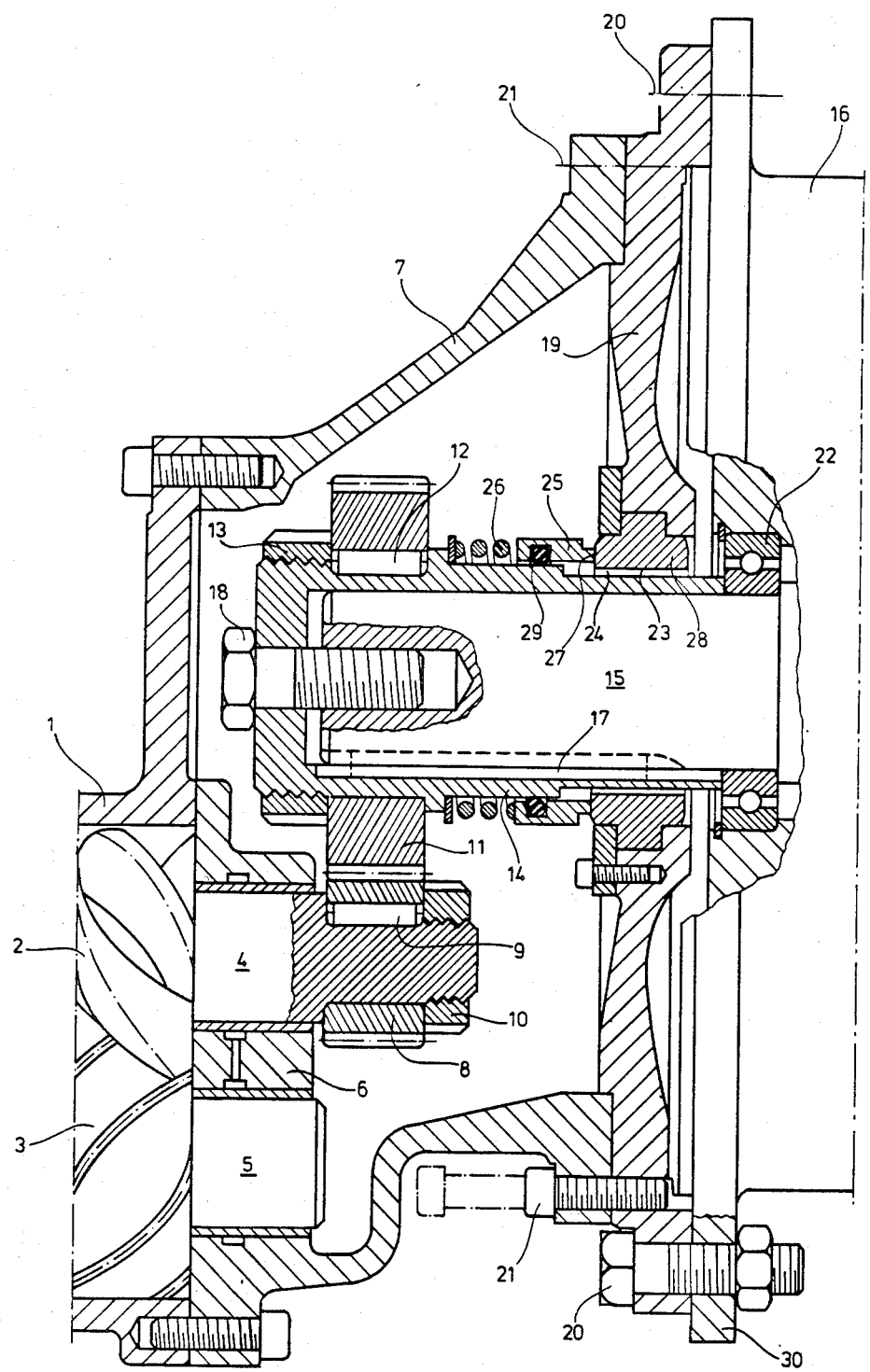

DRIVE FOR ROTARY COMPRESSOR

This invention relates to an arrangement in a rotary compressor to drive the shaft of the compressor rotor, enclosed in a rotor housing, by a motor shaft journalled in the motor, the rotor housing being fixedly connected to a gear housing into which the rotor shaft and a driving shaft protrude while engaging each other by gear wheels which are fixedly connected to the respective shafts.

The invention is intended primarily for such compressors where the working medium is compressed in working chambers formed between two or more rotors and a stationary surrounding rotor housing, and the sealing around the working chambers is effected with small clearances between the different parts and not by so-called positive sealing elements. Examples of positive sealing elements are the vanes of a sliding vane compresor, where the vanes seal against the surrounding rotor housing by being kept pressed against it.

Examples of compressors where the sealing around the working chambers is effected by small clearances are so-called screw compressors of the Lysholm type, such as those according to British patent No. 1,007,131 published Oct. 13, 1965, or according to U.S Pat. No. 3,462,072, or of the Zimmern type disclosed in U.S. Pat. No. 3,133,695.

In these compressors, it has proved that the compressor obtains an optimal efficiency within a limited peripheral speed range of the rotors, which peripheral speed range is different for different working media.

For driving the rotors, electric motors are usually used, which are obtainable for a small number of fixed rotation speeds. These rotation speeds are such that a change-speed gear, as shown in said British patent No. 1,077,131, often is required between the motor and the compressor in order that the rotors shall obtain a peripheral speed which provides an optimal efficiency of the compressor. This applies especially to compressors with rotors having a small diameter, where direct drive would provide too low a peripheral speed of the rotors.

Said British patent No. 1,007,131 discloses an arrangement in a compressor of the type initially described herein, where said driving shaft is constituted by a separate shaft which is journalled in the wall of the gear housing and which, by a shaft coupling, is connected to the shaft of a drive motor fastened to a separate support.

The drawbacks of the arrangement according to the British patent are that the drive motor requires a separate support, that the shaft of the drive motor requires an accurate aligning in relation to the said driving shaft, that the arrangement requires a great number of details, and that the length of the structure becomes great through said driving shaft and the shaft coupling.

These drawbacks are avoided by the arrangement according to the invention, in which the driving shaft is constituted by the motor shaft, the motor being attached to a wall part of the gear housing, which wall part together with the motor is detachable from the rest of the gear housing and has an opening through which the motor shaft extends. Sealing means are provided to prevent medium from forcing its way out of the gear housing through the space between the opening and the motor shaft, and the arrangement is such that the gear wheels become accessible for dismantling and assembly when the wall part together with the motor has been detached from the rest of the gear housing.

In this way, the gear housing of the compressor is used as a support for the drive motor, the alignment accuracy of the drive motor will be determined only by the manufacturing tolerances of the elements concerned, a separate driving shaft with bearings and bearing housing and shaft coupling will be eliminated, and the length of the structure will be shortened substantially by the length of said separate driving shaft. Furthermore, the bearings of the motor guarantee the journalling of the motor shaft and its gear wheels in the gear housing, so that any further bearings in the gear housing for the motor shaft are not needed. Also, it is easy to change gear wheels on the shafts if another peripheral speed of the rotor is wanted, as for the purpose of compressing a different working medium.

One and the same wall part can be provided with connecting means for optional mounting of motors of different sizes. Only small further changes need be made in the gear housing in order to adapt the compressor to a new motor size.

The arrangement according to the invention thus allows a great flexibility as to the choice of motor and also allows a high degree of standardization as to the other elements which are part of the arrangement.

According to a development of the invention, the sealing means are arranged so that they become accessible for dismantling and assembly when the wall part together with the motor has been detached from the rest of the gear housing. In this way, the sealing means can be installed in their place around the motor shaft and the opening in the wall part when the motor shaft and the opening in the wall part take their fixed operational positions relative to each other—by the motor and the wall part being fixedly interconnected to each other—so that it can be seen directly when the sealing means take their proper sealing positions.

According to a further development of the invention, the gear wheel of the motor shaft is fastened to the motor shaft via an intermediate sleeve. In this way, the degree of standardization is increased. Instead of requiring a series of gear wheels for each dimension of the motor shaft of different motor sizes, only one series of gear wheels is required, where all have the same hole diameter, and a series of sleeves which all have the same outer diameter fitting in the holes in the gear wheels but having different internal measures fitting together with the dimensions of the different motor shafts.

According to a further development of the invention, the sealing means are constituted by an annular part which rotates with the sleeve and which seals against an annular part arranged around the opening in the wall part. This further increases the degree of standardization by sealing means of only one size being required for the different motor sizes.

An example of an embodiment of the invention is shown on the attached drawing, where the single illustration is a longitudinal sectional view of a compressor driven by an electric motor via a toothed wheel gear.

The drawing shows the rotor housing 1 of a compressor of the Lysholm-type, which can be of the kind disclosed in U.S. Pat. No. 3,462,072 and of which only one end part is shown in the drawing. The housing 1 encloses two screw-formed rotors 2 and 3, which are rotatable around parallel axes and which engage each other, the rotor 2 driving the rotor 3. A working medium, such as a refrigerant when the compressor operates as a refrigeration compressor, is compressed in the housing 1 in working chambers formed between the rotors 2-3 and the housing 1.

The rotors 2 and 3 have shafts 4 and 5, respectively, by means of which the rotors are journalled in an end wall 6 of the housing 1. The shaft 4 protrudes into a gear housing 7 which is fixedly connected to the rotor housing and within which the shaft 4 is provided with a gear wheel 8 fastened to the shaft by a wedge 9 and nut 10.

The shaft 4 with the gear wheel 8 is driven by a gear wheel 11 which, by means of a wedge 12 and a nut 13, is fastened to a sleeve 14 which in turn is fastened to the shaft 15 of an electric motor 16 by a wedge 17 and a screw 18. Only one end portion of the motor 16 is shown.

The electric motor 16 has a connecting flange 30 detachably fastened to a wall part 19 of the gear housing 7 by screws 20. The wall part 19 is detachably fastened to the rest of the gear housing by screws 21. The motor shaft 15 is journalled solely in the bearings of the motor 16, one such bearing being shown at 22. The wall part 19 has an opening 23 through which the shaft 15 with the sleeve 14 extends into the gear housing 7, there being an intermediate annular clearance space 24. The opening 23 in the wall part 19 does not constitute any bearing for the shaft 15 with the sleeve 14.

Medium in the gear housing 7 is prevented from forcing its way out through the space 24 by sealing means comprising an annular part 25 which is arranged on the sleeve 14 and rotates with it. A spring 26 keeps annular part 25 pressed into sealing engagement with a stationary sealing surface 27 of an annular part 28 which is fixedly connected to the wall part 19. Furthermore, an O-ring 29 is provided to prevent medium from forcing its way out of the gear housing 7 between the part 25 and the sleeve 14.

To assemble the arrangement, with the wall part 19 removed from the gear housing 7, a suitable gear wheel is mounted on the shaft 4. The loose wall part 19 is slipped over the shaft 15 of the motor 16 and is fastened to the connecting flange 30 of the motor by the screws 20. The sleeve 14 is pushed onto the shaft 15 with the sealing part 25 and a gear wheel 11 (which fits in with the gear wheel 8) and is fastened to the shaft 15 by the screw 18. The wall part 19 with the attached motor 16 is then fastened to the rest of the gear housing 7 by the screws 21.

The wall part 19 is shaped so that different motors with different connecting dimensions of the flange 30 can be fastened to the wall part 19. For these different motors, it is suitable to use sleeves 14 with the same outer dimensions but which on the inside have varying measures, which fit together with the shafts of the different motors. In this way, it is possible to use the same wall part 19, the same sealing means 25, 26, 28 and 29 and the same gear wheel 11 with wedge 12 and nut 13 for motors of different sizes.

We claim:

1. In a rotary compressor, the combination of a compressor rotor having a shaft, a rotor housing enclosing said rotor, a motor having a drive shaft, means journalling said drive shaft only in the motor, a gear housing to which the rotor housing is fixedly connected, said rotor shaft and said drive shaft of the motor protruding into the gear housing, gear wheels fixedly connected to the respective shafts in the gear housing and through which said shafts engage each other, the gear housing having a wall part to which said motor is attached, means releasably connecting said wall part to the rest of the gear housing, whereby said wall part and motor are detachable as a unit from said rest of the gear housing, said wall part having an opening through which said drive shaft of the motor extends with a clearance space, sealing means for preventing a medium from forcing its way out of the gear housing through said clearance space, said gear wheels being accessible for dismantling and assembly when said wall part and motor are detached from said rest of the gear housing, an intermediate sleeve mounted on said drive shaft and slidable off one end thereof, said sleeve being dimensioned for insertion through said opening in said wall part, one of said gear wheels being mounted on the sleeve and slidable off one end thereof, means releasbly securing said one gear wheel against sliding off the sleeve, and means releasably securing the sleeve against sliding off said drive shaft.

2. The combination of claim 1, in which said sealing means are at least partly mounted on said sleeve.

* * * * *